United States Patent
Johnson et al.

(10) Patent No.: US 6,710,760 B1
(45) Date of Patent: Mar. 23, 2004

(54) UNIPOLAR DRIVE FOR CHOLESTERIC LIQUID CRYSTAL DISPLAYS

(75) Inventors: David M. Johnson, Rochester, NY (US); Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 283 days.

(21) Appl. No.: 09/723,389

(22) Filed: Nov. 28, 2000

(51) Int. Cl.[7] ................................................. G09G 3/36
(52) U.S. Cl. ............................ 345/94; 345/96; 345/97; 345/210
(58) Field of Search .......................... 345/87–103, 208, 345/209, 210; 349/33, 86, 87, 88, 92, 158, 169, 34, 37; 252/299.01

(56) References Cited

U.S. PATENT DOCUMENTS

| 4,435,047 | A | | 3/1984 | Fergason |
|---|---|---|---|---|
| 5,251,048 | A | | 10/1993 | Doane et al. |
| 5,437,811 | A | | 8/1995 | Doane et al. |
| 5,453,863 | A | | 9/1995 | West et al. |
| 5,644,330 | A | | 7/1997 | Catchpole et al. |
| 5,695,682 | A | | 12/1997 | Doane et al. |
| 5,748,277 | A | | 5/1998 | Huang et al. |
| 5,867,238 | A | * | 2/1999 | Miller et al. ................... 349/92 |
| 5,912,716 | A | * | 6/1999 | Stephenson .................. 349/106 |
| 6,002,383 | A | * | 12/1999 | Shimada ....................... 345/87 |
| 6,133,895 | A | * | 10/2000 | Huang .......................... 345/94 |
| 6,268,840 | B1 | * | 7/2001 | Huang .......................... 345/94 |
| 6,278,429 | B1 | * | 8/2001 | Ruth et al. ..................... 345/94 |
| 6,459,418 | B1 | * | 10/2002 | Comiskey et al. .......... 345/107 |

OTHER PUBLICATIONS

Paul S. Drzaic, Liquid Crystal Dispersions, World Scientific, Singapore, 1995, pp. 29, 408.

* cited by examiner

*Primary Examiner*—Amr Awad
(74) *Attorney, Agent, or Firm*—Raymond L. Owens

(57) ABSTRACT

A reflective memory display is disclosed which includes: a flexible polymeric substrate; a patterned first conductor disposed over the substrate; and a layer including a polymeric dispersed cholesteric liquid crystal material coated over the first patterned conductor. The memory display further includes a patterned second conductor disposed over the polymeric dispersed cholesteric liquid crystal; and control means for repeatedly applying selective unipolar voltages across particular portions of the patterned first and second conductors to cause electric fields which are applied to portions of the polymeric dispersed cholesteric liquid crystal layer to change its reflectance thereby presenting a series of different reflectance images.

19 Claims, 10 Drawing Sheets

UNIPOLAR DRIVE FOR CHOLESTERIC LIQUID CRYSTAL DISPLAYS

CROSS REFERENCE TO RELATED APPLICATION

Reference is made to commonly assigned U.S. patent application Ser. No. 09/379,776, filed Aug. 24, 1999 now, U.S. Pat. No. 6,394,870 by Dwight J. Petruchik et al., the disclosure of which is incorporated herein by reference.

FIELD OF THE INVENTION

The present invention relates to the electrical drive for reflective memory displays.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

Current flat panel displays use two transparent glass plates as substrates. In a typical embodiment, such as one set forth in U.S. Pat. No. 5,503,952, a set of electrical traces is sputtered in pattern of parallel lines that form a first set of conductive traces. A second substrate is similarly coated with a set of traces having a transparent conductive coating. Coatings are applied and the surfaces rubbed to orient liquid crystals. The two substrates are spaced apart and the space between the two substrates is filled with a liquid crystal material. Pairs of conductors from either set are selected and energized to alter the optical transmission properties of the liquid crystal material. Such displays are expensive, and currently are limited to applications having long lifetimes.

Fabrication of flexible, electronically written display sheets using liquid crystals materials is disclosed in U.S. Pat. No. 4,435,047. A first sheet has transparent indium-tin-oxide (ITO) conductive areas and a second sheet has electrically conductive inks printed on display areas. The sheets can be thin glass, but in practice have been formed of Mylar polyester. A dispersion of liquid crystal material in a binder is coated on the first sheet, and the second sheet is bonded to the liquid crystal material. Electrical potential is applied to opposing conductive areas to operate on the liquid crystal material and expose display areas. The display uses nematic liquid crystal materials, which ceases to present an image when de-energized. Currently, privacy windows are created using the scattering properties of conventional nematic liquid crystals. Such materials require continuous electrical drive to remain transparent.

U.S. Pat. No. 5,437,811 discloses a light-modulating cell having a chiral nematic liquid crystal in polymeric domains contained by conventional patterned glass substrates. The chiral nematic liquid crystal has the property of being driven between a planar state reflecting a specific visible wavelength of light and a light scattering focal-conic state. The structure has the capacity of maintaining one of the given states in the absence of an electric field.

In "Liquid Crystal Dispersions", World Science, Singapore, 1995, page 408, Paul Drzaic discusses the electrical drive of cholesteric liquid crystal displays. Drzaic also states on page 29 that "The use of gelatin, however, creates a material that is too conductive for practical use in electrically addressed PDLC systems.". Drzaic further states " . . . actual displays require AC signals to prevent electrochemical degradation." Subsequent patents follow Drzaic's assumptions. Later patents such as U.S. Pat. Nos. 5,251,048 and 5,644,330 and 5,748,277 all require AC fields having a net zero unipolar field for matrix cholesteric liquid crystal displays to prevent ionic destruction of the display. The cited patents have display structures formed using expensive display structures and processes applicable to long-life situations which require AC drive schemes.

The drive schemes require that each element be written using alternating electrical fields that provide a net zero field across the display to prevent ionic migration. AC drives require large numbers of power supplies and large numbers of switching elements per line.

The development of simple processes to manufacture inexpensive flexible displays will generate new markets of inexpensive, short lived displays that will benefit from a lower cost electrical drive circuitry.

SUMMARY OF THE INVENTION

It is an object of the present invention to provide low cost memory displays generated using coated polymeric dispersed cholesteric liquid crystals on flexible substrates.

It is another object of the present invention to provide a simpler, lower cost method of driving coated polymer dispersed cholesteric materials on flexible substrates.

These objects are achieved by a reflective memory display, comprising:

a) a flexible polymeric substrate;

b) a patterned first conductor disposed over the substrate;

c) a layer including a polymeric dispersed cholesteric liquid crystal material coated over the first patterned conductor;

d) a patterned second conductor disposed over the polymeric dispersed cholesteric liquid crystal; and e) control means for repeatedly applying selective unipolar voltages across particular portions of the patterned first and second conductors to cause electric fields which are applied to portions of the polymeric dispersed cholesteric liquid crystal layer to change its reflectance thereby presenting a series of different reflectance images.

The invention reduces the number of voltages required to drive such a display as well as reducing the number of voltage switching elements.

It is a feature of the present invention that it eliminates the need to work with glass substrates with associated complex manufacturing techniques. The present invention by making use of flexible polymeric substrates permits the use of unipolar fields to change reflectance. A unipolar drive reduces the associated cost of the drive circuit.

DETAILED DESCRIPTION OF THE INVENTION

Figure 1:
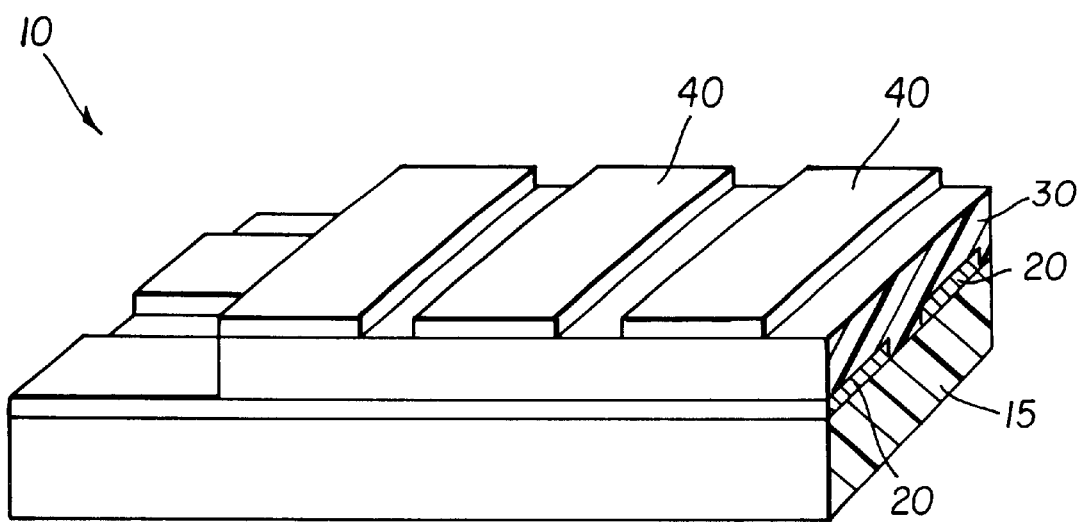
FIG. 1 is an isometric partial view of a cholesteric liquid crystal display made in accordance with the present invention.

FIG. 1 is an isometric partial view of a new structure for a display 10 made in accordance with the invention. Display 10 includes a flexible substrate 15, which is a thin transparent polymeric material, such as Kodak Estar film base formed of polyester plastic that has a thickness of between 20 and 200 microns. In an exemplary embodiment, substrate 15 can be a 125 micron thick sheet of polyester film base. Other polymers, such as transparent polycarbonate, can also be used.

First patterned conductors 20 are formed over substrate 15. First patterned conductors 20 can be tin-oxide or indium-tin-oxide (ITO), with ITO being the preferred material. Typically the material of first patterned conductors 20 is sputtered as a layer over substrate 15 having a resistance of less than 250 ohms per square. The layer is then patterned to form first patterned conductors 20 in any well known manner. Alternatively, first patterned conductors 20 can be an opaque electrical conductor material such as copper, aluminum or nickel. If first patterned conductors 20 are opaque metal, the metal can be a metal oxide to create light absorbing first patterned conductors 20. First patterned conductors 20 are formed in the conductive layer by conventional lithographic or laser etching means.

A polymer dispersed cholesteric layer 30 overlays first patterned conductors 20. Polymer dispersed cholesteric layer 30 includes a polymeric dispersed cholesteric liquid crystal material, such as those disclosed in U.S. Pat. No. 5,695,682, the disclosure of which is incorporated by reference. Application of electrical fields of various intensity and duration can drive a chiral nematic material (cholesteric) into a reflective to a transmissive state or an intermediate state. These materials have the advantage of maintaining a given state indefinitely after the field is removed. Cholesteric liquid crystal materials can be Merck BL112, BL118 or BL126, available from EM Industries of Hawthorne, N.Y.

In the preferred embodiment, polymer dispersed cholesteric layer 30 is E.M Industries cholesteric material BL-118 dispersed in deionized photographic gelatin. The liquid crystal material is dispersed at 8% concentration in a 5% deionized gelatin aqueous solution. The mixture is dispersed to create 10 micron diameter domains of the liquid crystal in aqueous suspension. The material is coated over a patterned ITO polyester sheet to provide a 9 micron thick polymer dispersed cholesteric coating. Other organic binders such as polyvinyl alcohol (PVA) or polyethylene oxide (PEO) can be used. Such compounds are machine coatable on equipment associated with photographic films.

Second patterned conductors 40 overlay of polymer dispersed cholesteric layer 30. Second patterned conductors 40 should have sufficient conductivity to carry a field across light modulating material 30. Second patterned conductors 40 can be formed in a vacuum environment using materials such as aluminum, tin, silver, platinum, carbon, tungsten, molybdenum, tin or indium or combinations thereof. The second patterned conductors 40 are as shown in the form of a deposited layer. Oxides of said metals can be used to darken second patterned conductors 40. The metal material can be excited by energy from resistance heating, cathodic arc, electron beam, sputtering or magnetron excitation. Tin-oxide or indium-tin oxide coatings permit second patterned conductors 40 to be transparent.

In a preferred embodiment, second patterned conductors 40 are printed conductive ink such as Electrodag 423SS screen printable electrical conductive material from Acheson Corporation. Such printed materials are finely divided graphite particles in a thermoplastic resin. In the preferred embodiment, second patterned conductors 40 are formed using the printed inks to produce a low cost display. The use of a flexible support for substrate 15, laser etching to form first patterned conductors 20, machine coating polymer dispersed cholesteric layer 30 and printing second patterned conductors 40 permits the fabrication of very low cost memory displays. Small displays formed using these methods can be used as electronically re-writable tags for inexpensive, limited rewrite applications.

Figure 2:
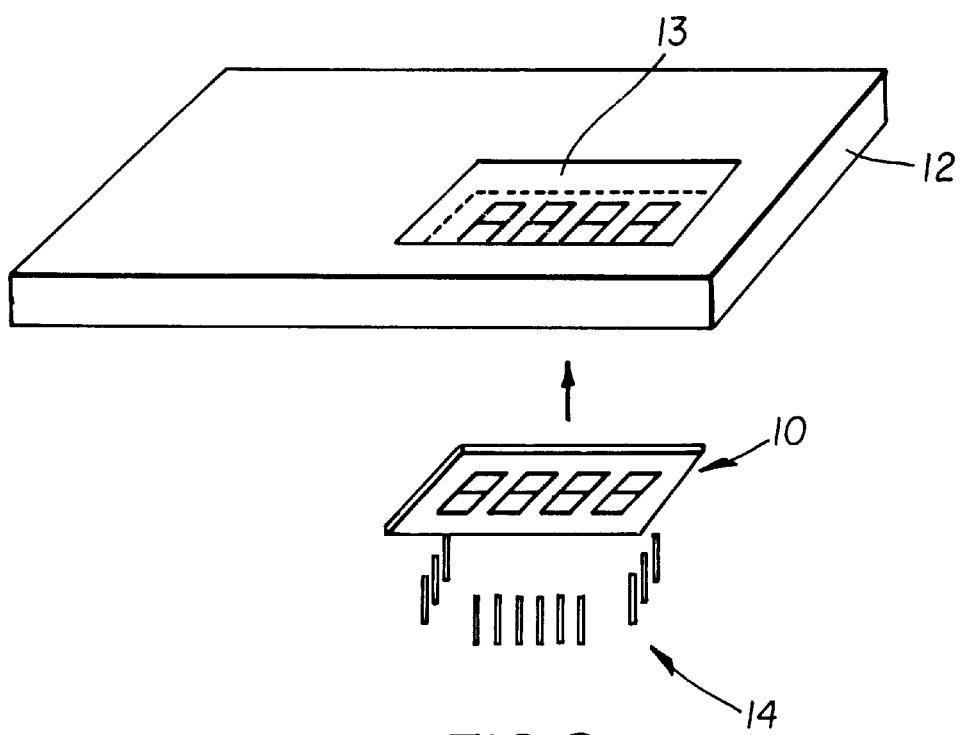
FIG. 2 is an assembly diagram of the display in FIG. 1 being attached to a card.

FIG. 2 an assembly diagram of display 10 in FIG. 1 being attached to a card 12. Card 12 can be a transparent sheet, approximately 1 millimeter in thickness which has information printed on one surface. A non-printed area 13 provides a clear window for viewing the contents of display 10, which has been bonded to the opposite side of card 12. Display 10 in this example has a transparent substrate 15, and is inverted from the position shown in FIG. 1 during the attachment process. Information written to display 10 is seen through non-printed area 13, through card 12 and through transparent substrate 15. Card 12 attached to display 10 according to the current invention can be inserted into a writer (not shown) and contacts 14 can be connected during the insertion process to second patterned conductors 40 on display 10 to update information on display 10. Display 10 can be used a financial transaction (credit/debit) card typically requiring less than 10,000 updated images.

Figure 3A:
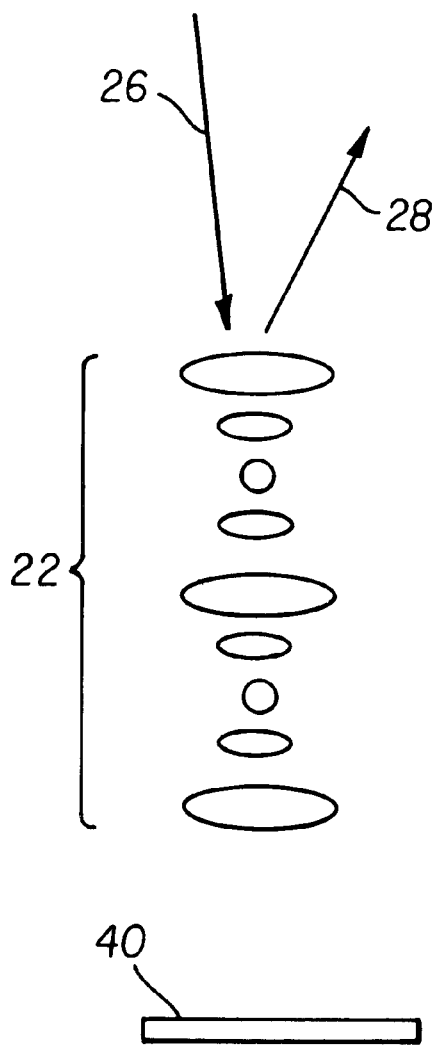
FIG. 3A is a schematic sectional view of a chiral nematic material in a planar state reflecting light.
Figure 3B:
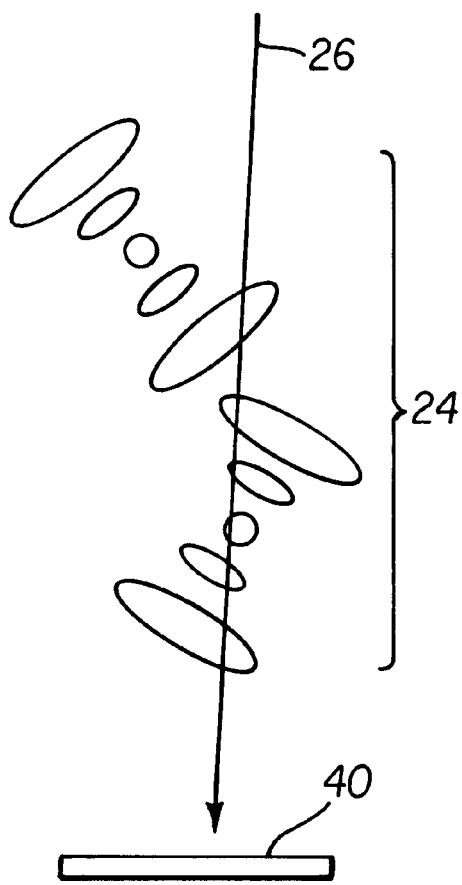
FIG. 3B is a schematic sectional view of a chiral nematic material in a focal-conic state transmitting light.

FIG. 3A and FIG. 3B show two stable states of cholesteric liquid crystals. In FIG. 3A, a high voltage field has been applied and quickly switched to zero potential, which converts cholesteric liquid crystal to planar state 22. Incident light 26 striking cholesteric liquid crystal in planar state 22 is reflected to create a bright image. In FIG. 3B, application of a lower voltage field leaves cholesteric liquid crystal in a transparent focal conic state 24. Incident light 26 striking a cholesteric liquid crystal in focal conic state 24 is transmitted. Second patterned conductors 40 can be black which will absorb incident light 26 to create a dark image when the liquid crystal material is in focal conic state 24. As a result, a viewer perceives a bright or dark image depending on if the cholesteric material is in planar state 22 or focal conic state 24 respectively.

Figure 4:
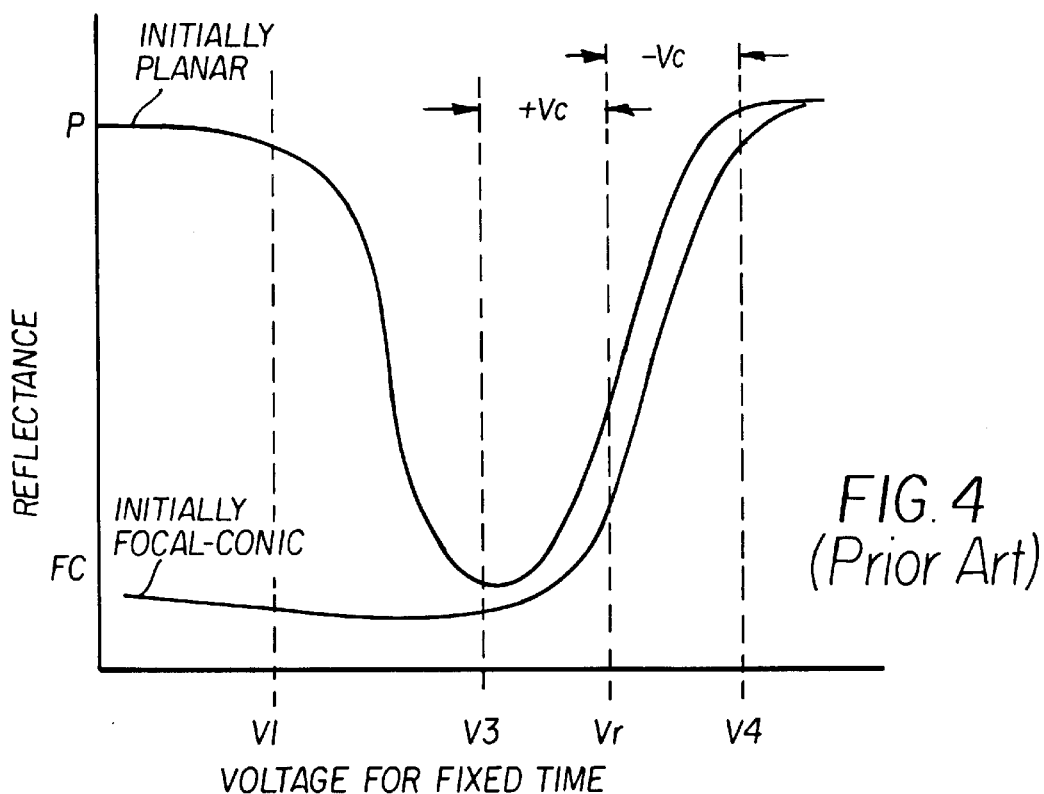
FIG. 4 is a plot of the response of a first polymer dispersed cholesteric material to a pulsed electrical field with a first set of imposed voltages.

FIG. 4 is a plot of the response of a cholesteric material to a pulsed electrical field. Such curves can be found in U.S.

Pat. Nos. 5,453,863 and 5,695,682 and are also recited in the above-cited Drzaic reference. For a given pulse time, typically between 5 and 200 milliseconds, a pulse at a given voltage can change the optical state of a cholesteric liquid crystal. Voltage below disturbance voltage V1 can be applied without changing the state of the cholesteric material. A higher voltage pulse at a focal-conic voltage V3 will force a cholesteric material into the focal conic (FC) or transparent state. A voltage pulse at planar voltage V4 will force the cholesteric material into the planar (P) or reflective state. The curve characteristic of cholesteric liquid crystal permits passive matrix writing of cholesteric displays. The prior art written for cholesteric displays covers displays built using expensive conventional flat panel display processes. Consequently, current state of the art requires AC voltage drive schemes for cholesteric displays to prevent ionic damage. Those bipolar drives require at least two voltages and two separate semiconductor switching elements for each drive line.

Figure 5:
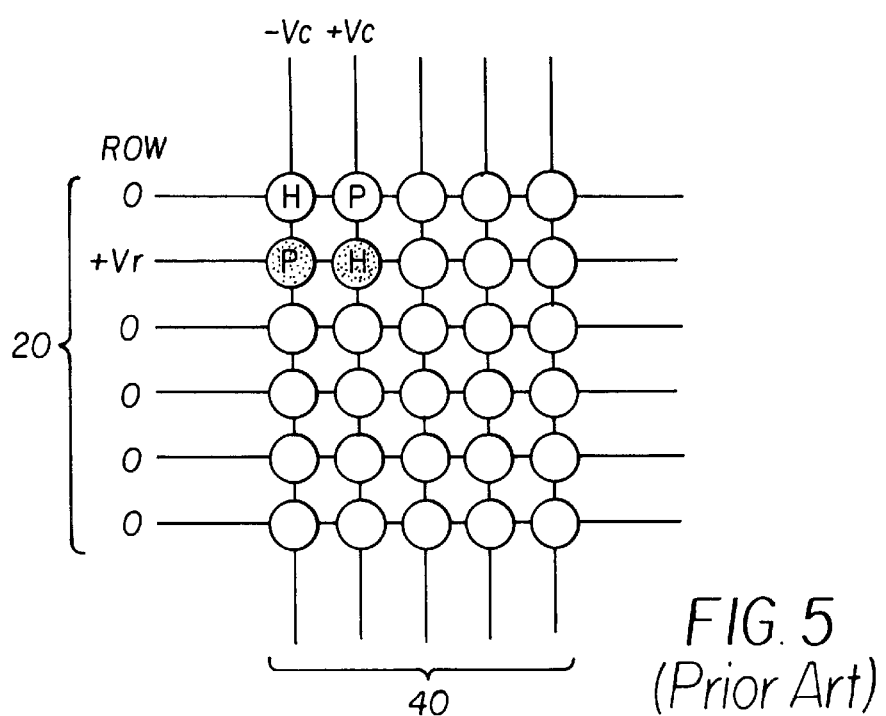
FIG. 5 is a schematic representation of a matrix array of cholesteric liquid crystal elements.

FIG. 5 is a schematic representation of a matrix array of cholesteric liquid crystal elements according to prior art. Row voltage Vr is set midway between V3 and V4 on a selected row while the remaining rows are set to a ground voltage. A positive or negative column voltage Vc is set across all columns to offset Vr to either focal-conic voltage V3 or planar voltage V4, depending on the desired final state of a row of pixels. The positive and negative column voltages Vr-V3 and V4-Vr are less than disturbance voltage V1 so that rows at ground potential experience voltages less than disturbance voltage V1 and are not changed. The material characteristic permits sequential row writing.

Figure 6:
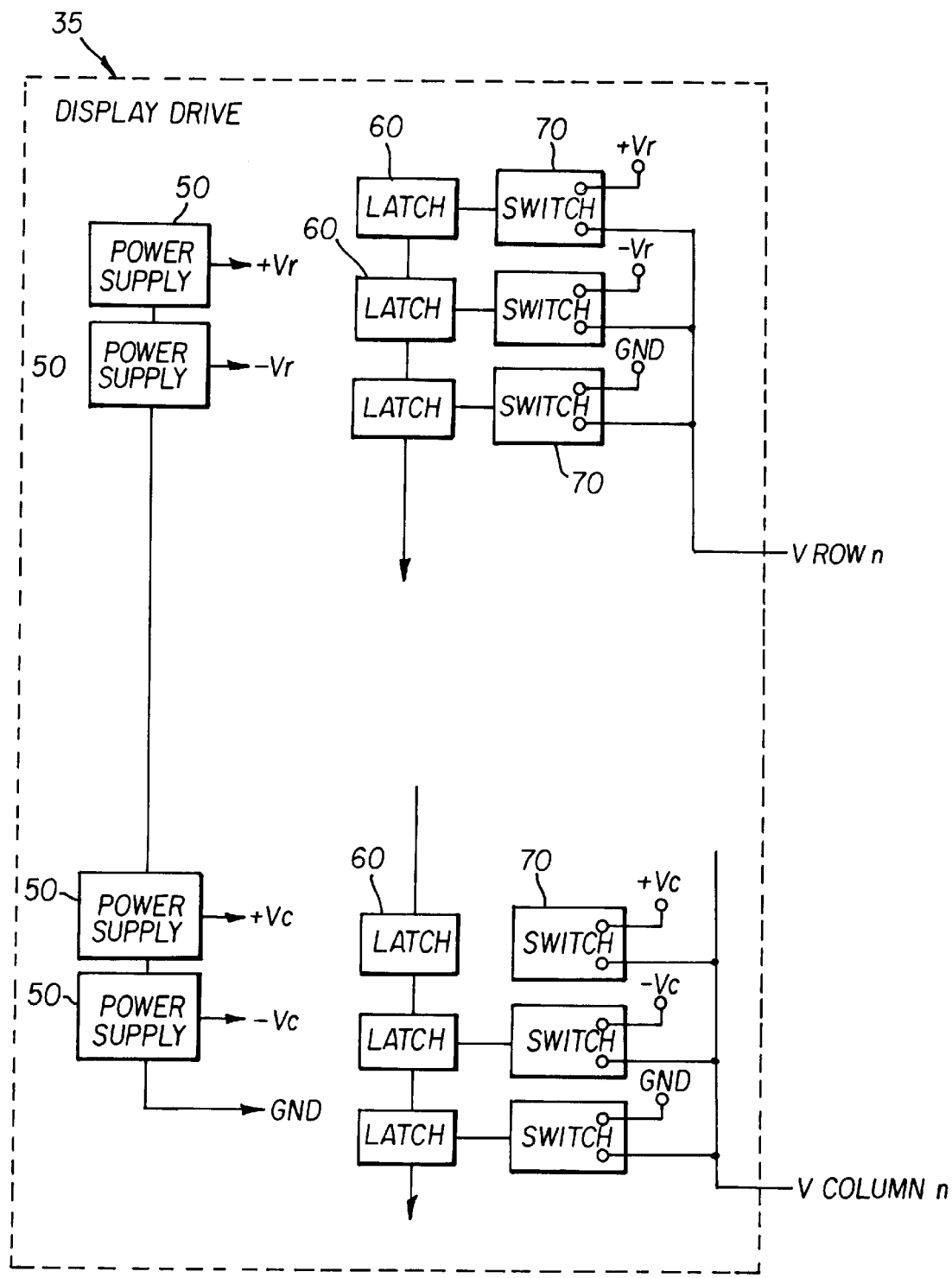
FIG. 6 is an electrical schematic of prior art used to drive the display of FIG. 1.

FIG. 6 is an electrical schematic of typical prior art used to drive the display of FIG. 1 based on the teaching in U.S. Pat. No. 5,644,330. Four power supplies 50 are needed to supply +Vc, -Vc, ground, +Vr and -Vr. Using conventional drive chip architecture, data is shifted serially through the chip and stored in latches 60. Each of 6 voltages (+Vr, -Vr, 0row, +Vc, -Vc, Ground) must have a switch 70 to drive a matrix cholesteric display. More complex switching schemes have been proposed which have an higher number of power supply and switching elements, such as U.S. Pat. No. 5,748,277.

Figure 7:
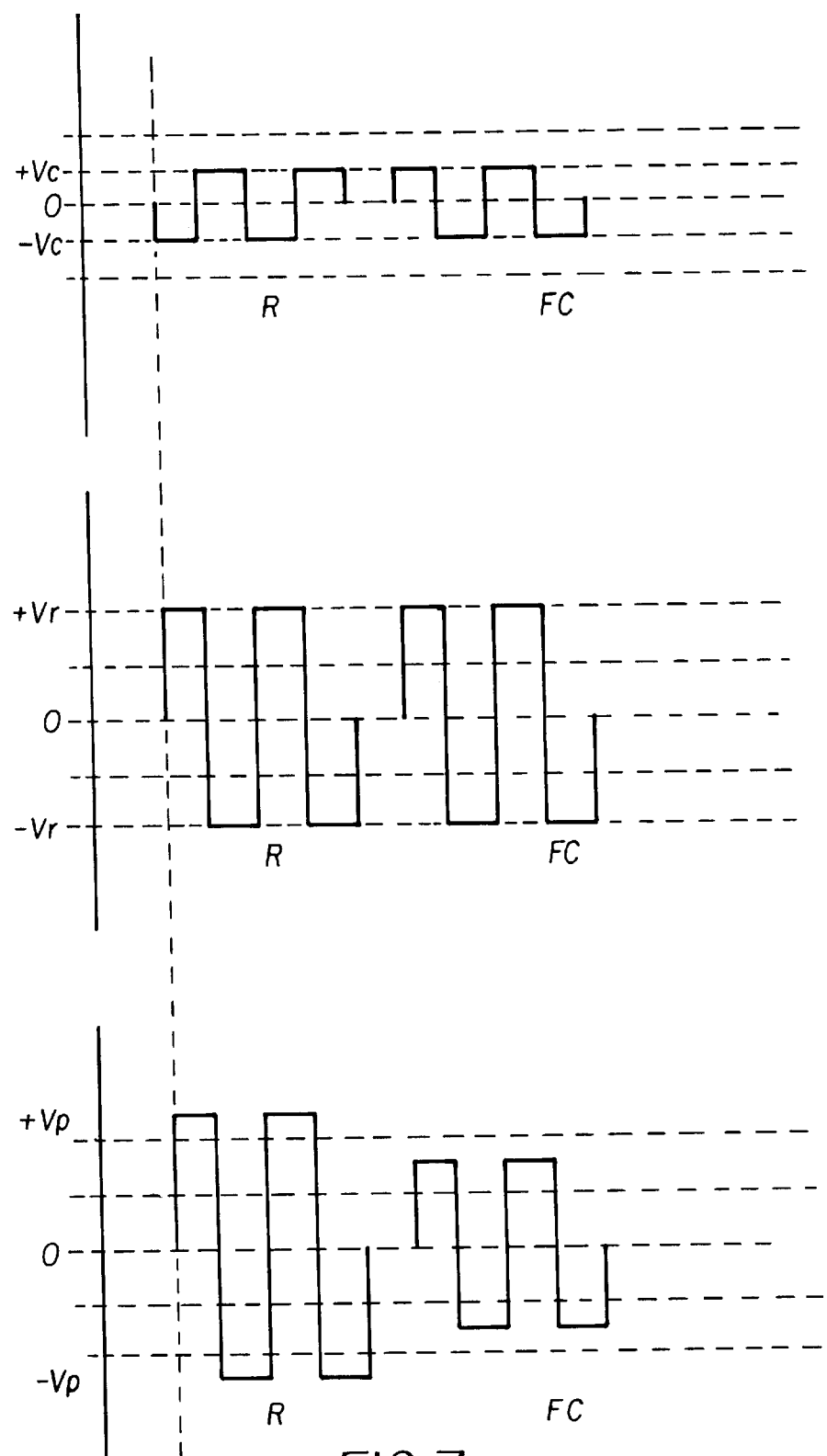
FIG. 7 is a diagram of the waveform generated by prior art when driving the display of FIG. 1.

FIG. 7 is a diagram of the waveform generated by prior art when driving the display 10 of FIG. 1. An bipolar row voltage Vr can be applied to a selected row, while a bipolar column voltage Vc is applied either in phase or out of phase with the row voltage Vr. If the AC voltages are out of phase, the pixel will experience alternating bipolar high pixel voltage Vp, corresponding to V4 and be written into the planar state. If the two voltages are in of phase, then a pixel experiences lower alternating bipolar pixel voltage Vp, corresponding to V3 and be written into the focal conic state FC. Columns held at a ground state (0) will experience a bipolar alternating column voltage Vc as an alternating AC field equivalent to half the voltage difference between V4 and V3. That voltage must be less than disturbance voltage V1. The variation in phase creates a net DC filed across the cholesteric display material.

In an experiment, gelatin dispersed cholesteric material dispersed and coated to the preferred embodiment was coated over ITO coated flexible substrate 15 to form polymer dispersed cholesteric layer 30. A one inch square conductive patch was printed over the gelatin dispersed cholesteric material to provide a field across the coating. A 20 millisecond unipolar field was switched across display 10 every 5 seconds to switch the state of the material between the planar and focal conic states. The gelatin dispersed cholesteric material was driven through a limited life test of 10,000 re-writes. The life testing was equivalent to 200 seconds of continuous applied unipolar voltage to display 10. The test patch operated with no apparent visible degradation throughout the life test. The life test was then extended to 100,000 cycles. The test display 10 continued to perform with little degradation. From this experiment, it was concluded that polymeric dispersed cholesteric materials on flexible substrates 15 with printed conductors can be driven by unipolar fields for at least the limited number of life cycles needed for limited-life display applications.

Figure 8:
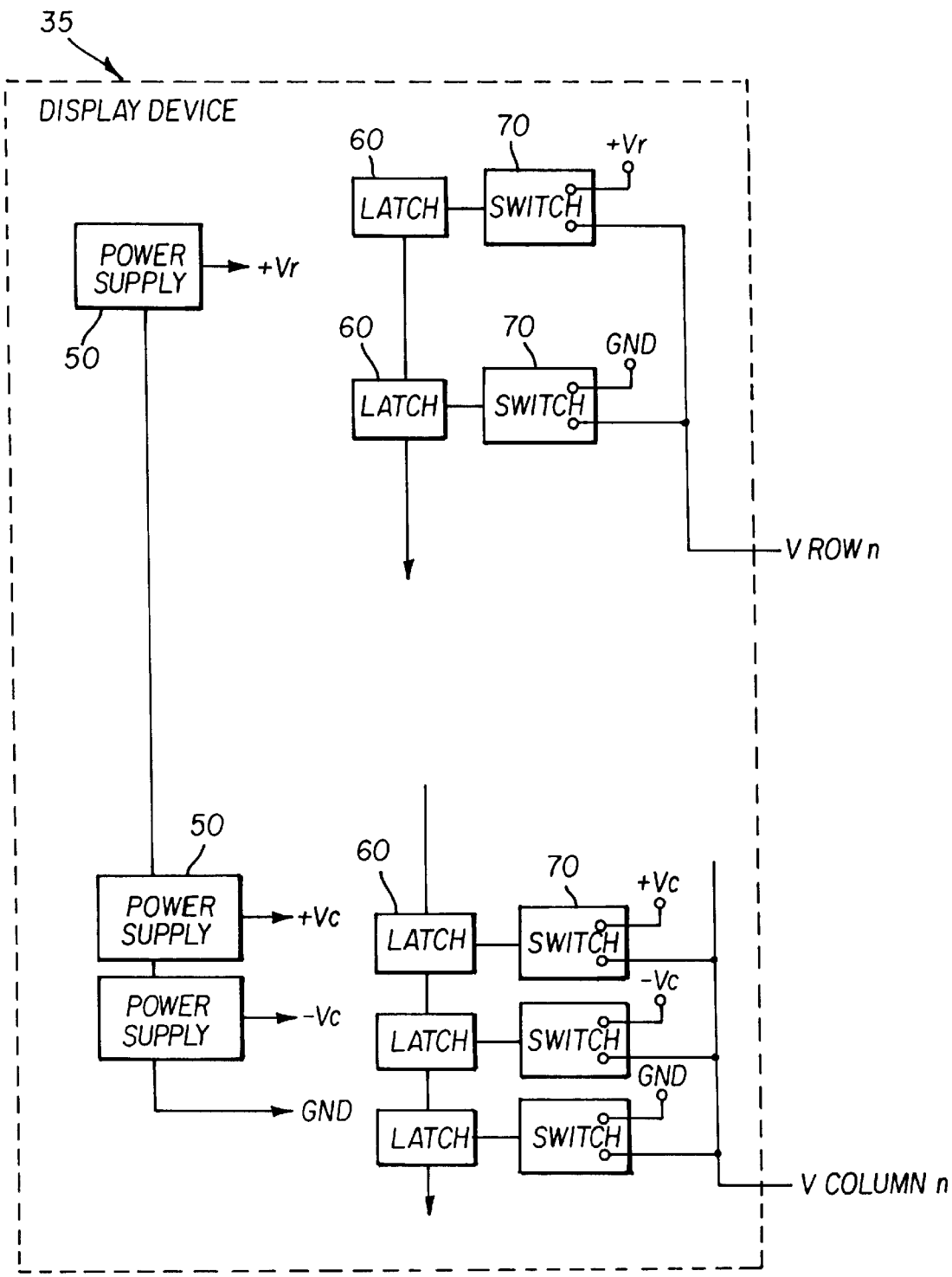
FIG. 8 is an electrical schematic of a second embodiment of the current invention used to drive the display of FIG. 1.

FIG. 8 is a representative plot of the response of a first polymer-dispersed cholesteric material of the preferred embodiment to a pulsed electrical field with a set of imposed voltages according to the present invention. The DC unipolar life test implies that displays can be produced using unipolar fields on cholesteric materials for substantial number of actuations. A first embodiment of this drive scheme for such displays uses a hybrid scheme for materials having the difference between the planar voltage V4 and focal-conic voltage V3 greater than disturbance voltage V1 as shown in FIG. 4. A voltage response curve for such a material has been shown in FIG. 4. In the hybrid scheme, a high unipolar voltage is used for row voltage Vr, and a lower bipolar voltage is used as a column voltage Vc. The writing fields are applied as a unipolar field, with positive and negative column voltages setting the optical state for succesive rows. The column voltage Vc in either polarity can be as high as the disturbance voltage V1. The drive architecture eliminates −Vr, one power supply for the row voltage, and eliminates one switch 60 for the row voltage Vr.

Figure 9:
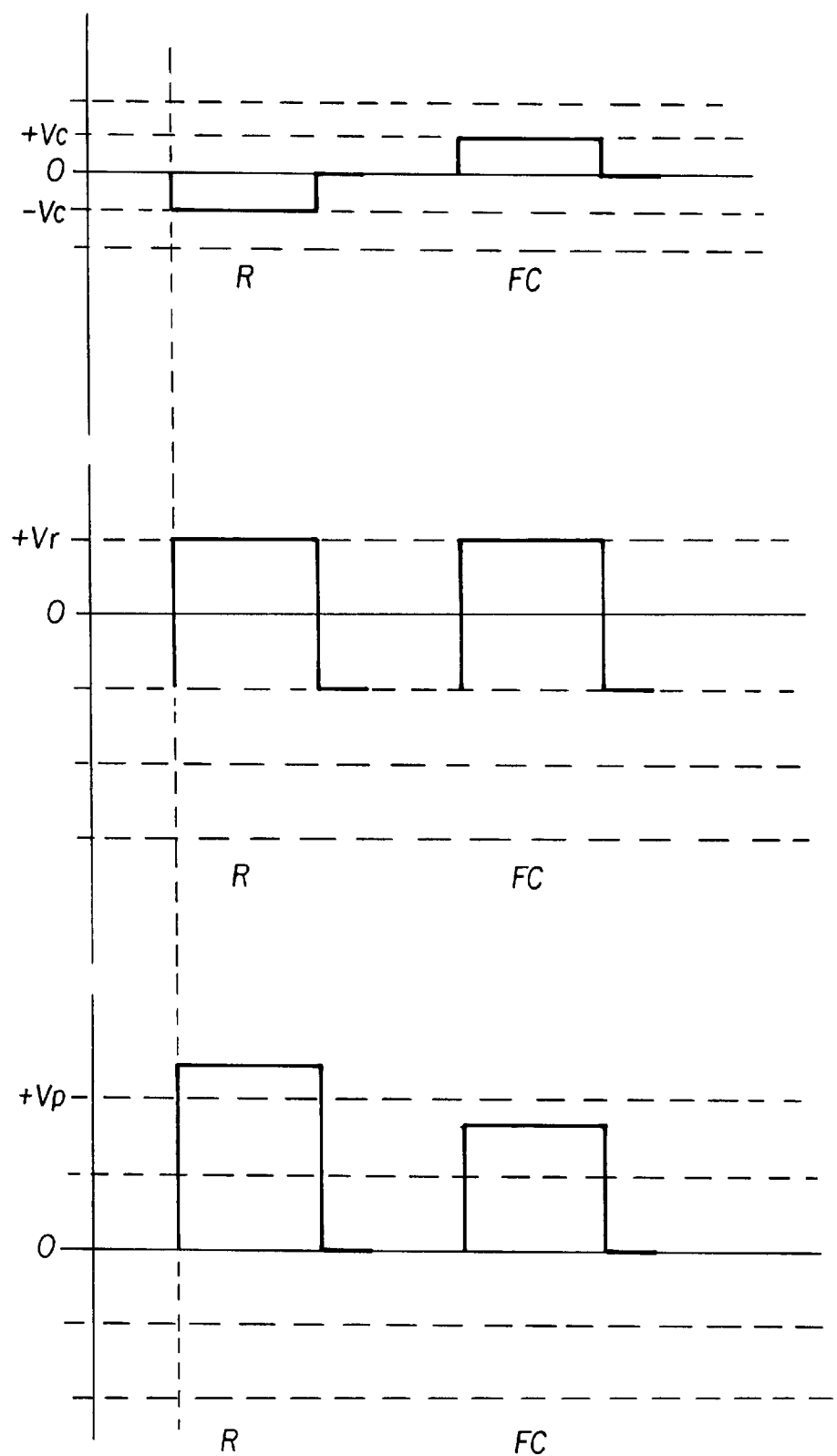
FIG. 9 is a diagram of the waveform generated by the second embodiment of the current invention to drive the display of FIG. 1.

FIG. 9 is a schematic of the waveforms generated by the drive shown in FIG. 8. The column voltage Vc drives cholesteric material to the reflective state in the negative state and to the focal-conic (clear) state with a positive voltage. Both drive states provide a unipolar field of varying intensity across the material in each pixel. The column voltage is bipolar, however the net effect on each pixel is to provide a unipolar field. The hybrid drive structure eliminates one power supply and one switching element for each column.

Figure 10:
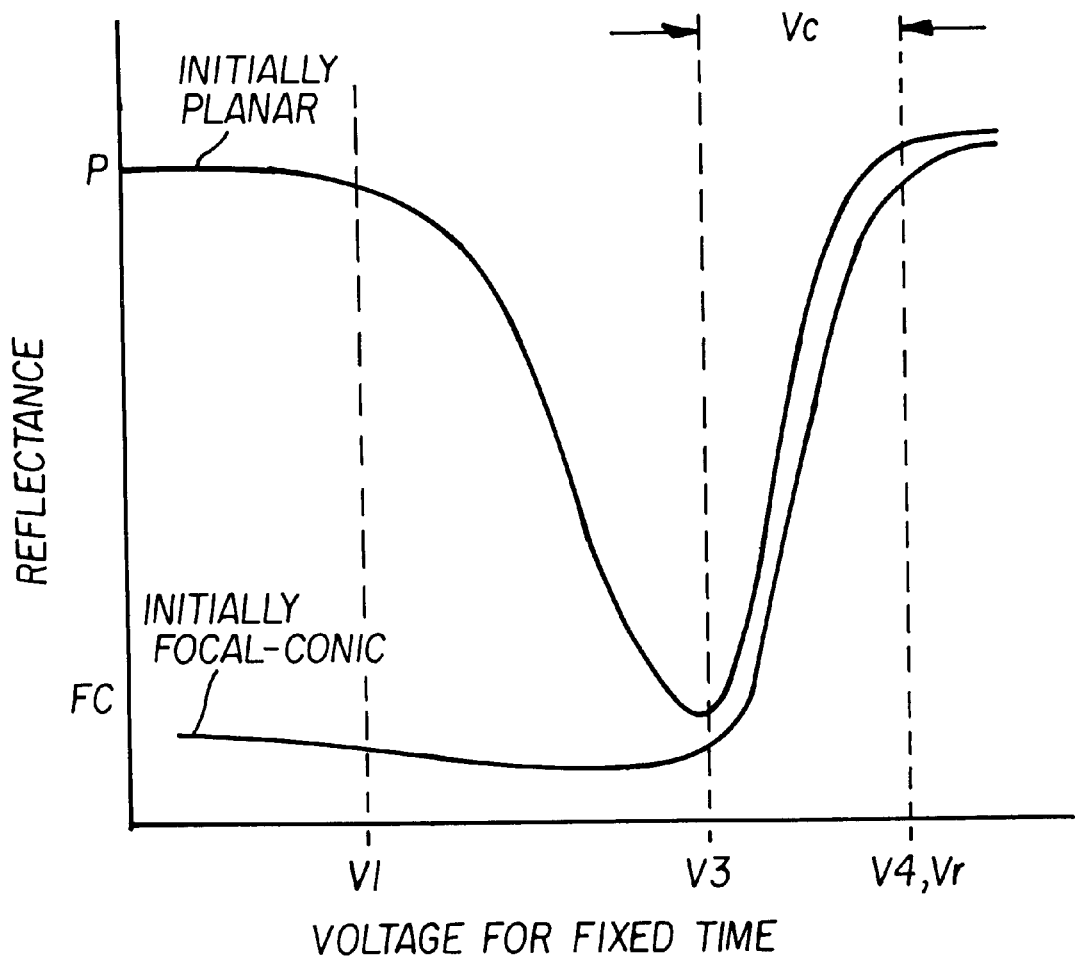
FIG. 10 is a plot of the response of a second polymer dispersed cholesteric material to a pulsed electrical field with a second set of imposed voltages.

FIG. 10 is the plot of the response of a second polymer-dispersed cholesteric material to a pulsed electrical field with a set of imposed voltages according to the present invention. The second embodiment of this invention requires that the difference in voltage between focal-conic voltage V3 and planar voltage V4 be less than disturbance voltage V1. Row voltage Vr is set at the potential required to drive cholesteric material into the planar state, planar voltage V4. A positive column voltage is applied to offset Vr down to focal-conic voltage V3. Switching a ground voltage to a column applies the full column voltage Vc to a pixel and drives the material to the reflective state.

Figure 11:
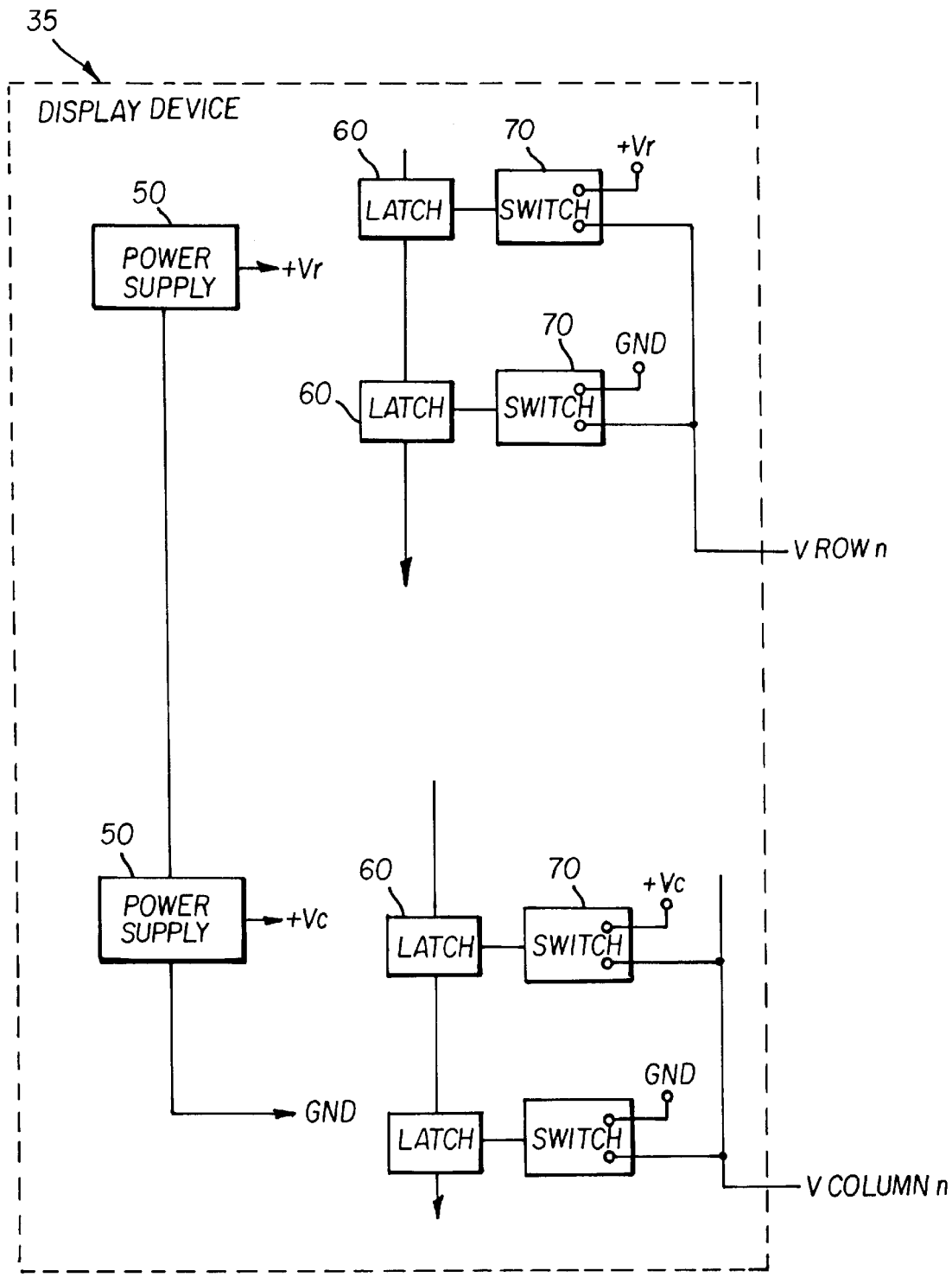
FIG. 11 is an electrical schematic of a first embodiment of the current invention used to drive the display of FIG. 1.

FIG. 11 is an electrical schematic of a first embodiment of the current invention used to drive the display 10 of FIG. 1. The power supply requirement is reduced from four to two, one to provide row voltage Vr and one to provide column voltage Vc. Two switches 70 are required for each row and each column line instead of three.

Figure 12:
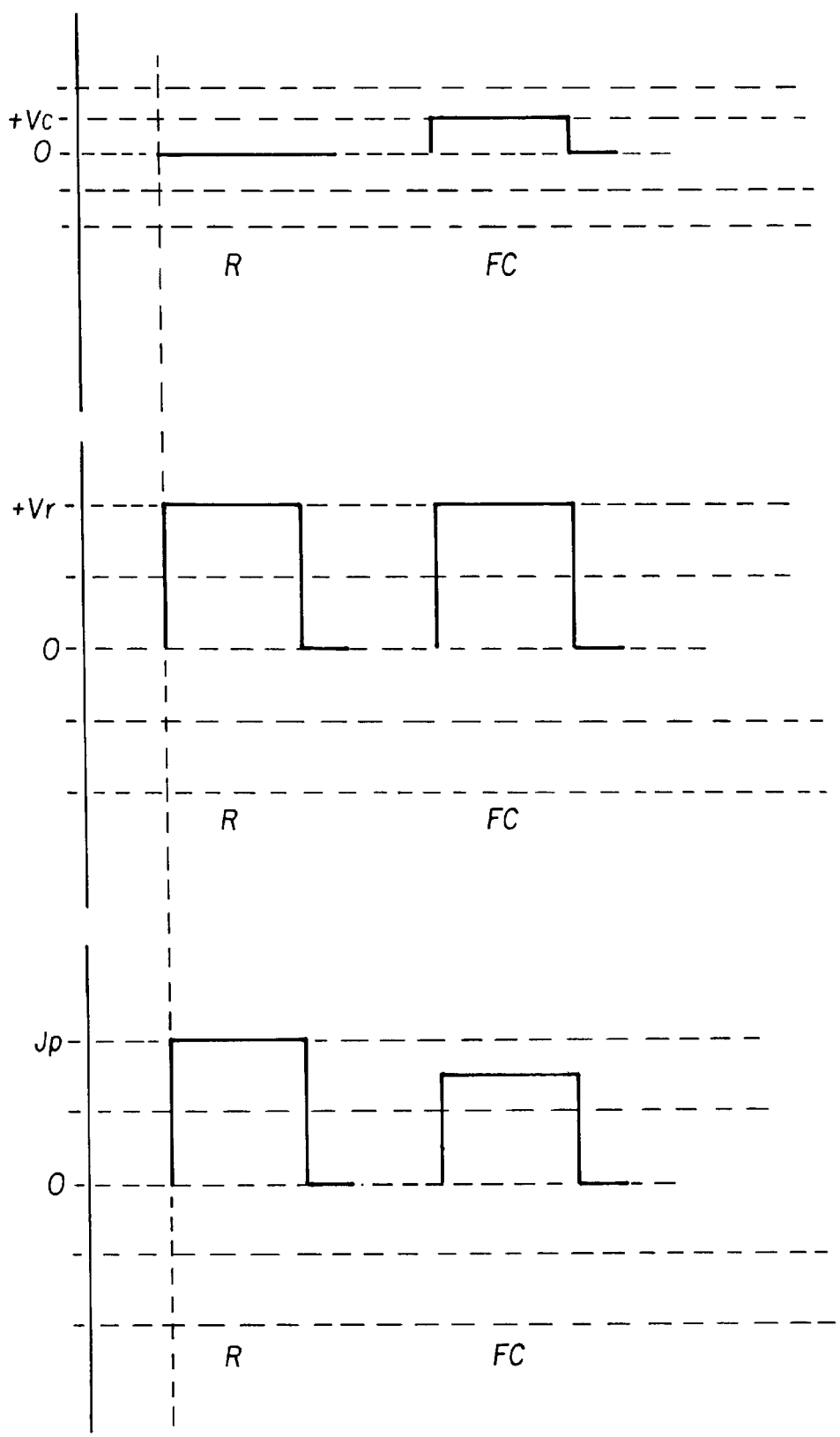
FIG. 12 is a diagram of the waveform generated by the first embodiment of the current invention to drive the display of FIG. 1.

FIG. 12 is a diagram of the waveform generated by the first embodiment of the current invention to drive the display 10 of FIG. 1. An individual row is selected by row voltage Vr, while the other rows are set to zero potential. If column voltage Vc is at ground (0), pixel voltage Vp will be equal to planar voltage V4 and the pixel will be driven into the planar state. If the column voltage Vc is set to disturbance voltage V1, the pixel experiences a low field strength equivalent to focal-conic voltage V3 and the pixel will be driven into the focal-conic (FC) state. The focal conic voltage is less than disturbance voltage V1 and the unwritten rows held at ground are undisturbed by an applied column voltage Vc.

The invention has been described in detail with particular reference to certain preferred embodiments thereof, but it will be understood that variations and modifications can be effected within the spirit and scope of the invention.

10 display
12 card
13 non-printed area
14 connector pins
15 substrate
20 first patterned conductors
22 planar state
24 focal conic state
26 incident light
28 reflected light
30 polymer dispersed cholesteric layer
35 display drive
40 second patterned conductors
50 power supply
60 registers
70 switches
FC focal-conic
P planar
V1 disturbance voltage
V3 focal-conic voltage
V4 planar voltage
Vc column voltage
Vr row voltage
Vp pixel voltage

What is claimed is:

1. A reflective memory display, comprising:
   a) a flexible polymeric substrate;
   b) a first patterned conductor disposed over the substrate;
   c) a layer including a polymeric dispersed cholesteric liquid crystal material coated over the first patterned conductor;
   d) a second patterned conductor disposed over the polymeric dispersed cholesteric liquid crystal; and
   e) control means for repeatedly applying selective voltages across particular portions of the first and second patterned conductors, wherein the combination of selective voltages produces unipolar electric fields across respective portions of the polymeric dispersed cholesteric liquid crystal layer to change reflectances of the respective portions of the polymeric dispersed cholesteric liquid, thereby presenting a series of different reflectance images.

2. The reflective memory display of claim 1 wherein the level of the applied unipolar voltages is changed for different images to provide different reflectances for different pixels.

3. The display of claim 1 wherein the polymeric dispersed cholesteric liquid crystal material includes gelatin.

4. The display of claim 1 wherein the substrate is a polymeric sheet, the first patterned conductor includes a transparent conductor, and the second patterned conductor includes carbon in a polymeric binder.

5. A reflective memory display, comprising:
   a) a flexible polymeric substrate;
   b) a first patterned conductor disposed over the substrate;
   c) a layer including a polymeric dispersed cholesteric liquid crystal material coated over the first patterned conductor;
   d) a second patterned conductor disposed over the polymeric dispersed cholesteric liquid crystal and aligned with the first patterned conductor to provide rows and columns of pixels; and
   e) control means for repeatedly applying selective voltages across different rows and columns of the aligned first and second patterned conductors, wherein the combination of selective voltages produces a unipolar electric field for different pixels to be applied across portions of polymeric dispersed cholesteric liquid crystal layer to change reflectances of the portions of polymeric dispersed cholesteric liquid crystal layer, thereby presenting a series of different reflectance images which is greater than one hundred without a substantial change to the electrooptical characteristics of the cholesteric liquid crystal material that will degrade the reflective images.

6. The display of claim 5 wherein the polymeric dispersed cholesteric liquid crystal material includes gelatin.

7. The display of claim 5 wherein the substrate is a polymeric sheet, the first patterned conductor includes a transparent conductor, and the second patterned conductor includes carbon in a polymeric binder.

8. A display device, comprising:
   a transparent polymeric substrate;
   a first patterned conductor disposed over the transparent polymeric substrate;
   a cholesteric layer including a polymeric dispersed cholesteric liquid crystal material disposed over the first patterned conductor;
   a second patterned conductor disposed over the cholesteric layer; and
   a drive circuit that selectively applies voltages to portions of the first and second patterned conductors, wherein the combination of selective voltages the produces unipolar electric fields having selected magnitudes across respective portions of the cholesteric layer, wherein the selected magnitudes of the unipolar electric fields cause the respective portions of the cholesteric layer to be in a reflective optical state or a transparent optical state.

9. The display device of claim 8, wherein the drive circuit selectively supplies a unipolar voltage to one of the first and second patterned conductors and selectively supplies a bipolar voltage to the other of the first and second patterned conductors, wherein a magnitude of the unipolar voltage is greater than a magnitude of the bipolar voltage, such that electric fields generated jointly by the unipolar voltage and the bipolar voltage are unipolar electric fields.

10. The display device of claim 9, wherein portions of the cholesteric layer assume the reflective optical state in response to application of the unipolar voltage and a first polarity of the bipolar voltage, and assume the transparent optical state in response to application of the unipolar voltage and a second polarity of the bipolar voltage.

11. The display device of claim 8, wherein the drive circuit selectively supplies a first unipolar voltage to one of the first and second patterned conductors and selectively supplies a second unipolar voltage to the other of the first and second patterned conductors.

12. The display device of claim 11, wherein portions of the cholesteric layer assume the reflective optical state in response to application of the first unipolar voltage and assume the transparent optical state in response to joint application of the first unipolar voltage and the second unipolar voltage.

13. The display device of claim 8, wherein the respective portions of the cholesteric layer comprise a matrix of pixels, the first patterned conductor selectively applies voltages from the drive circuit to one of rows and columns of the matrix of pixels, and the second patterned conductor selectively applies voltages from the drive circuit to the other of rows aid columns of the matrix of pixels.

14. The display device of claim 13, wherein the drive circuit selectively supplies a unipolar voltage to one of rows and columns of the matrix of pixels aid selectively supplies a bipolar voltage to the other of rows and columns of the matrix of pixels, wherein a magnitude of the bipolar voltage is less than a magnitude of the unipolar voltage, such that electric fields generated jointly by the unipolar voltage and the bipolar voltage are unipolar electric fields.

15. The display device of claim 14, wherein pixels assume the reflective optical state in response to application of the unipolar voltage and a first polarity of the bipolar voltage, and assume the transparent optical state in response to application of the unipolar voltage and a second polarity of the bipolar voltage.

16. The display device of claim 13, wherein the drive circuit selectively supplies a first unipolar voltage to one of rows and columns of the matrix of pixels and selectively supplies a second unipolar voltage to the other of rows and columns of the matrix of pixels.

17. The display device of claim 16, wherein pixels assume the reflective optical state in response to application of the first unipolar voltage and assume the transparent optical state in response to joint application of the first unipolar voltage and the second unipolar voltage.

18. The display device of claim 8, wherein the transparent polymeric substrate is flexible.

19. The display device of claim 8, wherein the first patterned conductor includes a transparent conductor, and the second patterned conductor includes carbon in a polymeric binder.

* * * * *